United States Patent
Mao et al.

(10) Patent No.: US 11,273,342 B2
(45) Date of Patent: Mar. 15, 2022

(54) VIEWER FEEDBACK BASED MOTION VIDEO PLAYBACK

(71) Applicant: INTERNATIONAL BUSINESS MACHINES CORPORATION, Armonk, NY (US)

(72) Inventors: Xiao Xia Mao, Shanghai (CN); Yidan Lei, Shanghai (CN); Jing Xia, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/659,661

(22) Filed: Oct. 22, 2019

(65) Prior Publication Data

US 2021/0113889 A1 Apr. 22, 2021

(51) Int. Cl.
| | | |
|---|---|---|
| *G09B 19/00* | (2006.01) | |
| *A63B 24/00* | (2006.01) | |
| *G06V 10/44* | (2022.01) | |
| *G06V 20/40* | (2022.01) | |
| *G06V 40/20* | (2022.01) | |

(52) U.S. Cl.
CPC ........ *A63B 24/0062* (2013.01); *G06V 10/443* (2022.01); *G06V 20/46* (2022.01); *G06V 40/23* (2022.01); *G09B 19/0038* (2013.01); *A63B 2024/0068* (2013.01)

(58) Field of Classification Search
CPC .............. G09B 19/003; G09B 19/0038; G06K 9/00342
See application file for complete search history.

(56) References Cited

U.S. PATENT DOCUMENTS

| | | | |
|---|---|---|---|
| 7,519,200 B2 | 4/2009 | Gokturk | |
| 7,780,450 B2 | 8/2010 | Tarry | |
| 9,283,429 B2 | 3/2016 | Aragones | |
| 2012/0143358 A1* | 6/2012 | Adams | ............... G06K 9/00342 700/92 |
| 2013/0089843 A1 | 4/2013 | Hutchison | |
| 2014/0308640 A1 | 10/2014 | Forman | |
| 2015/0196803 A1 | 7/2015 | Shavit | |
| 2018/0353836 A1* | 12/2018 | Li | ...................... G06K 9/00711 |

(Continued)

FOREIGN PATENT DOCUMENTS

| | | |
|---|---|---|
| CN | 101604447 A | 12/2009 |
| JP | 2019012965 A | 1/2019 |

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Peter R Egloff
(74) *Attorney, Agent, or Firm* — Tihon Poltavets

(57) ABSTRACT

The embodiments of the present disclosure disclose a computer-implemented method, an apparatus and a computer program product for automatic control of video play mode. In the method, a prerecorded video of a demonstrator's motions is played while a real-time video of an imitator's motions is being obtained. The imitator's motions in the real-time video are compared with the demonstrator's motions in the prerecorded video. A play mode of the prerecorded video is controlled based on a comparing result.

20 Claims, 9 Drawing Sheets

(56) References Cited

U.S. PATENT DOCUMENTS

2019/0019321 A1    1/2019  Thielen
2019/0362139 A1*  11/2019  Mehl ..................... A61B 5/1116
2020/0306589 A1*  10/2020  Jabr ....................... G06T 13/40

OTHER PUBLICATIONS

Ningthoujam, "Construction and Importance of Video Based Analyses Teaching in Physical Education By Use of Window Live Movie Maker", Video Journal of Education and Pedagogy, Aug. 2, 2016, pp. 1-16.

Qing et al., "On-Line Detection and Temporal Segmentation of Actions in Video Based Human-Computer Interaction", http://cjc.ict.ac.cn/online/onlinepaper/sq-2015112471811.pdf, Chinese Journal of Computers, vol. 38, No. 12, Dec. 2015, pp. 1-11.

* cited by examiner

VIEWER FEEDBACK BASED MOTION VIDEO PLAYBACK

BACKGROUND

The present invention relates to video instruction, and more specifically, to a computer-implemented method, an apparatus and a computer program product for automatic control of video play mode.

Presently, a user can learn and mimic body movements, such as physical exercises and physical therapy, by viewing a tutorial video on a display device. In the tutorial video, a demonstrator (e.g., an instructor or physical therapist) may exhibit some example motions. After viewing the example motions, the learner may imitate the demonstrator's motions. The learner may also be referred to as an imitator in the following.

SUMMARY

According to one embodiment of the present invention, a computer-implemented method is provided. In the method, a prerecorded video of a demonstrator's motions is played, and a real-time video of an imitator's motions is being obtained concurrently. The imitator's motions in the real-time video are compared with the demonstrator's motions in the prerecorded video. A play mode of the prerecorded video is controlled based on a comparing result.

According to another embodiment of the present invention, an apparatus is provided. The apparatus includes one or more processors, a memory coupled to the one or more processors, and a set of computer program instructions stored in the memory and executed by the one or more processors to implement the method according to the one embodiment of the present invention as described above.

According to still another embodiment of the present disclosure, a computer program product is provided. The computer program product comprises a computer readable storage medium having program instructions embodied therewith. The program instructions are executable by one or more processors to implement the method according to the one embodiment of the present disclosure as described above.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
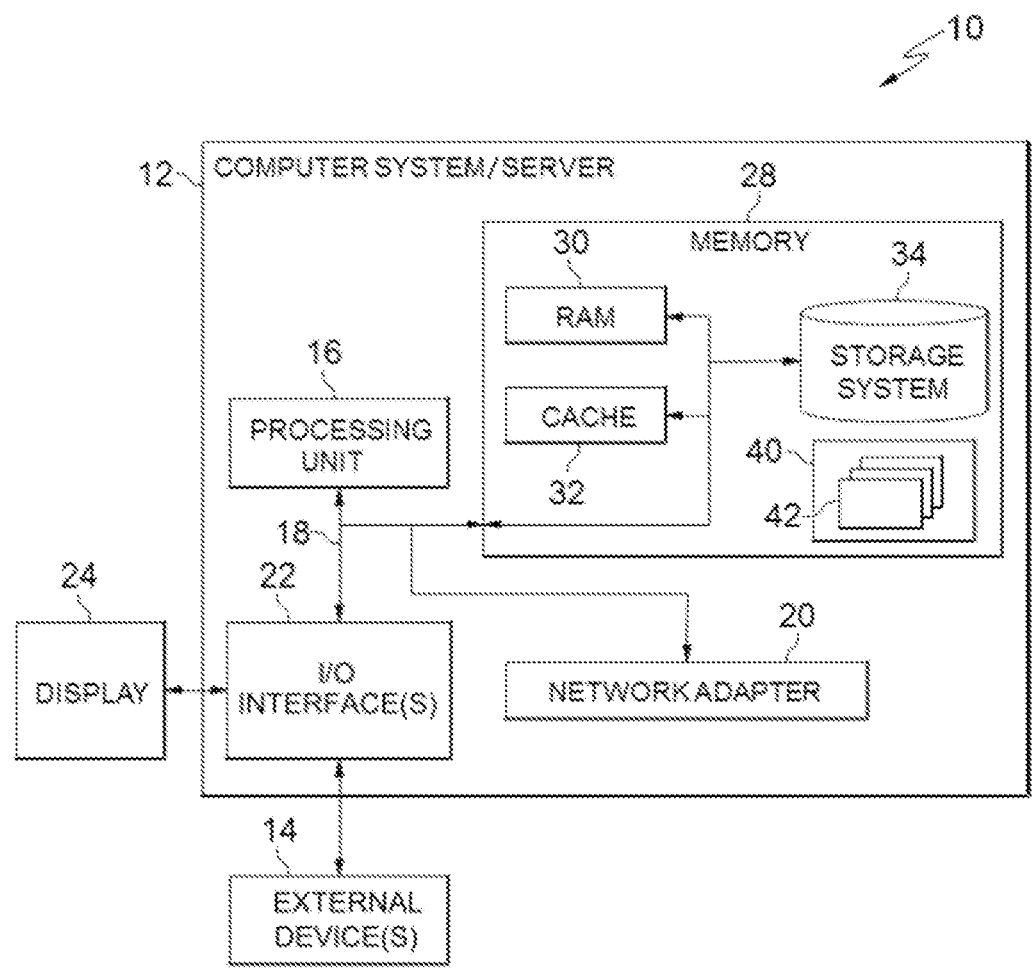
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
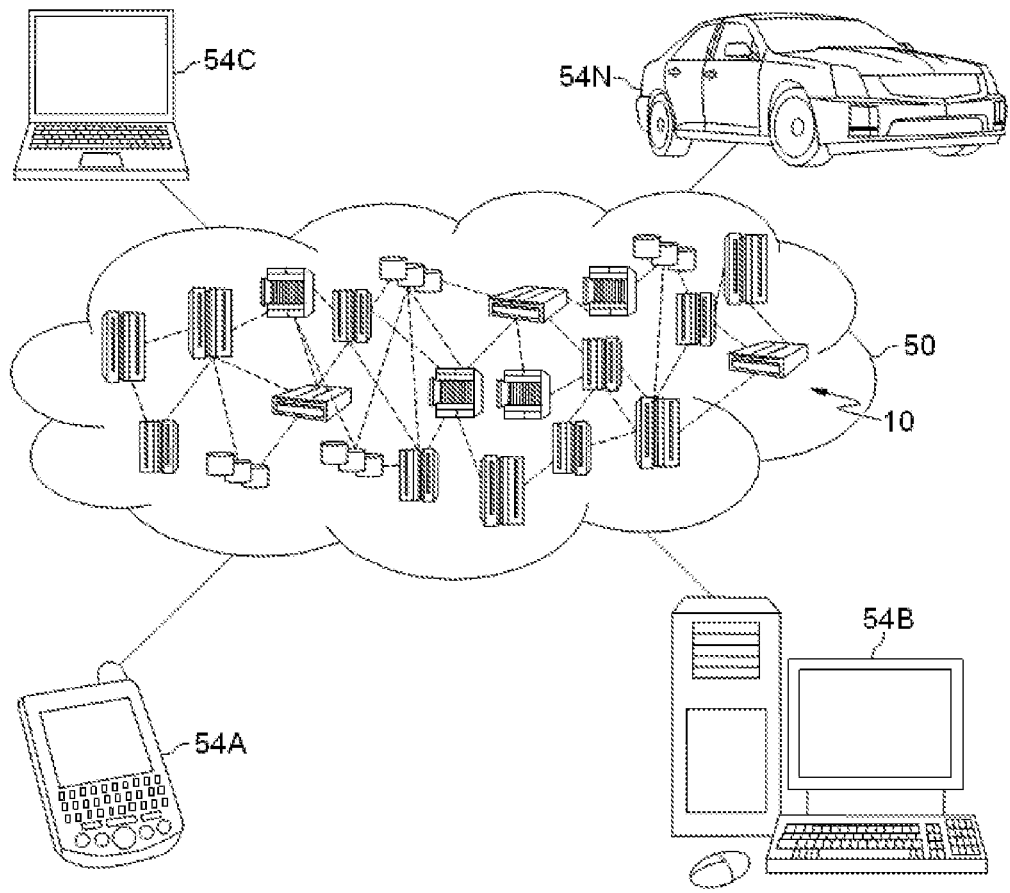
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
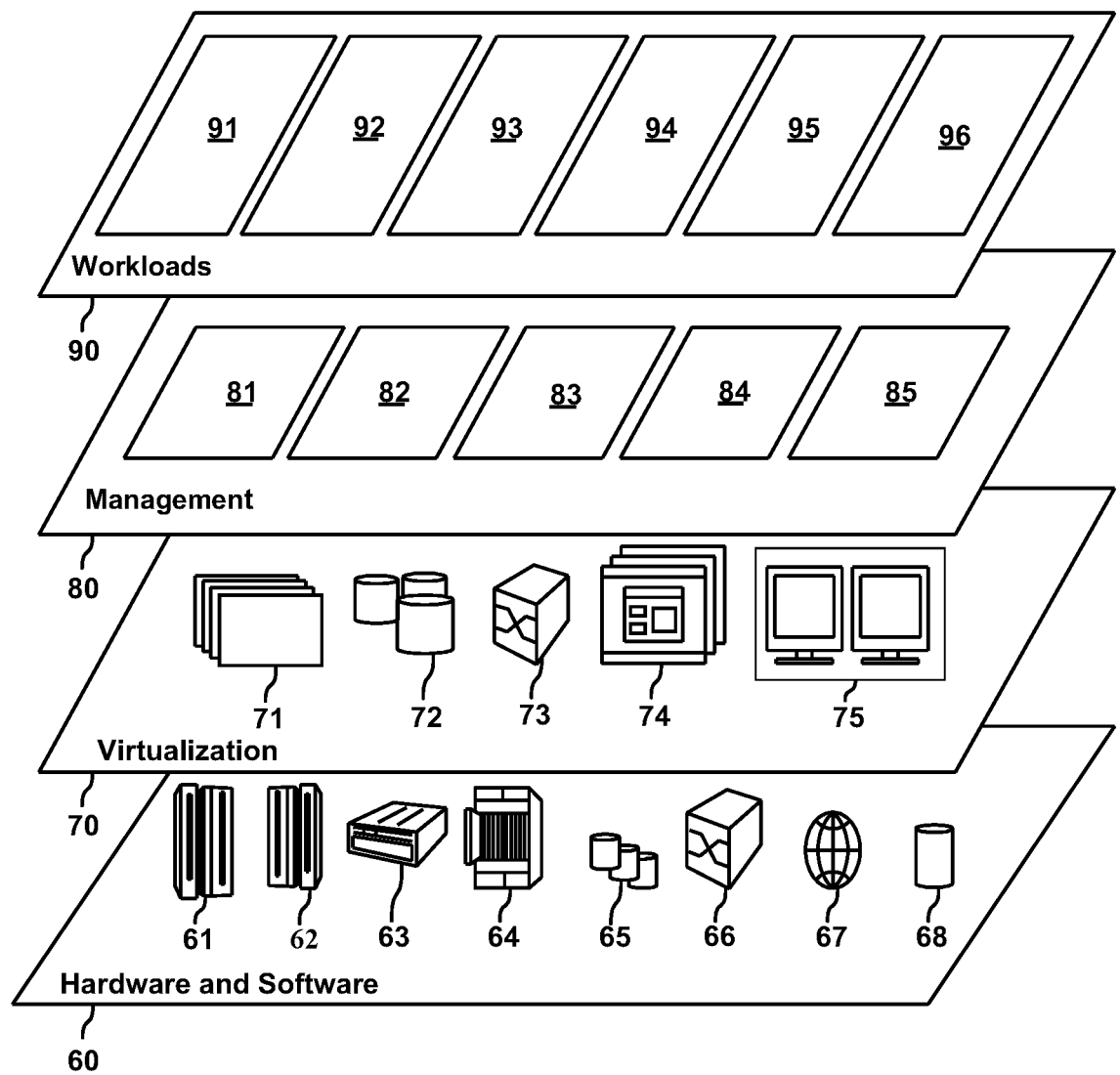
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic control of video play mode 96.

Sometimes it may be difficult for an imitator to follow the actions of the demonstrator in the tutorial video. In this case, the imitator may have to pause and play back the video manually, which may interrupt the continuity of the imitator's motions. In some circumstances, it may be inconvenient for the imitator to press the pause button, the rewind button, or the play button on the display device during the learning process. Therefore, this kind of learning approach may be inefficient and time wasting.

Figure 4:
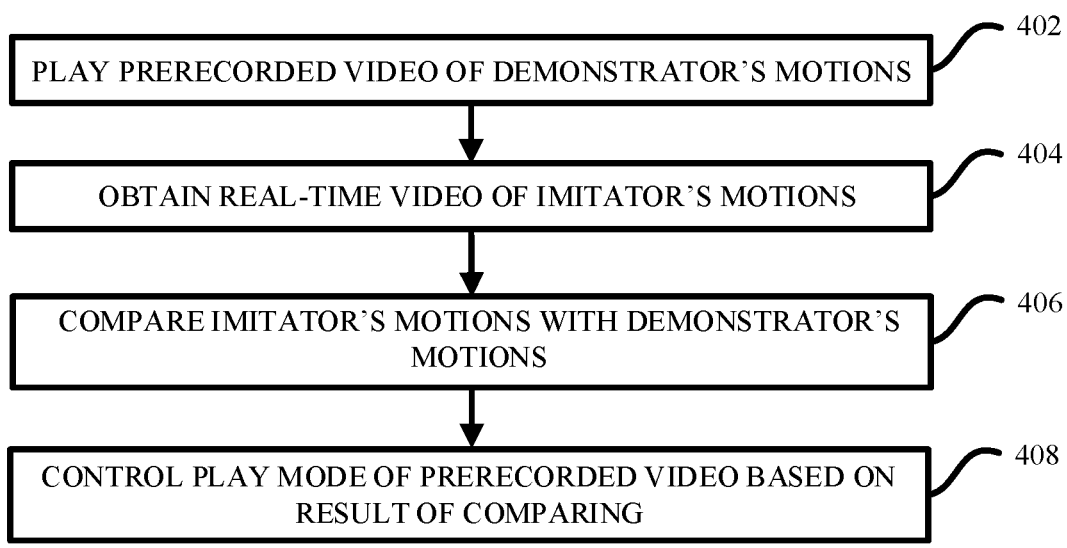
FIG. 4 depicts a schematic flowchart of the method for automatic control of video play mode according to an embodiment of the present disclosure.

With reference now to FIG. 4, it shows a schematic flowchart of the method 400 for automatic control of video play mode according to an embodiment of the present disclosure. This embodiment will be described in detail below in conjunction with the figures.

It should be noted that the processing of automatic control of video play mode according to embodiments of this disclosure could be implemented by computer system/server 12 of FIG. 1. It could also be implemented by any kind of user equipment or computing devices including, but not limited to, smart phone, smart camera, PDA, tablet, laptop, pad or other devices, with which a video can be displayed. The apparatus for implementing the processing of automatic control of video play mode can run with any kind of operating system including, but not limited to, Windows, Linux, UNIX, Android, iOS and their variants.

As shown in FIG. 4, at block 402, a prerecorded video of a demonstrator's motions may be played on a display device. The prerecorded video may be the tutorial video. This video may be edited from one or more original videos of the demonstrator's motions, which may be recorded in advance by one or more recording devices (e.g., cameras) respectively. In this way, the demonstrator's motions may be exhibited from one or more angles in the prerecorded video. In an example, a music or a voice guidance may be included in the prerecorded video to help the imitator to keep up with the demonstrator. In the case that multiple cameras are utilized to produce the prerecorded video, a 3D model of the demonstrator may be generated using the original videos captured by the multiple cameras.

In an embodiment, the prerecorded video may additionally include a supplementary part, in which the demonstrator may exhibit some simplified movements and/or decomposition actions. The supplementary part plays a role of backup scheme. In a normal video play mode (referred to as "normal mode" hereinafter for short), the supplementary part is not played. But when the imitator cannot follow the demonstrator's motions, the supplementary part may be designed to be played in an easier mode, such that it is easier for the imitator to learn from the simplified movements and/or decomposition actions.

At block 404, a real-time video of an imitator's motions may be obtained. While the prerecorded video of the demonstrator's motions is being played, the imitator may try to imitate the demonstrator's motions. The imitator's motions may be recorded in real time by one or more recording devices (e.g., cameras) according to the displaying angle in the prerecorded video. For example, when the displaying angle in the prerecorded video is the front of the demonstrator, the recording device in front of the imitator may be selected to record the imitator's motion. When the displaying angle in the prerecorded video is the left side of the demonstrator, the recording device in the left of the imitator may be selected to record the imitator's motion.

In the case that the imitator's motions are recorded in real time, a plurality of real-time video segments may be generated by the recording device(s) one by one. The real-time video segments may constitute the aforementioned real-time video. Each real-time video segment may include several frames. Once a real-time video segment is generated, the generated video segment may be sent to the apparatus for implementing the method 400.

At block 406, the imitator's motions in the real-time video may be compared with the demonstrator's motions in the prerecorded video. In an embodiment, in order to obtain a real-time comparing result, the imitator's motions may be compared with the demonstrator's motions once one real-time video segment is obtained. The detailed process of comparing will be described later in conjunction with FIG. 5.

At block 408, a play mode, also referred to as a display mode, of the prerecorded video may be controlled based on a result of the comparing. In an embodiment of the present disclosure, the prerecorded video may be played in one of the following modes: a normal mode, a slower mode, and an easier mode. At the beginning of the learning process, the prerecorded video may be played in the normal mode.

If the result of the comparing indicates that the imitator's motions keep up with the demonstrator's motions, the prerecorded video may not be changed, e.g., still be played in the normal mode.

If the result of the comparing indicates that the imitator's motions are ahead of the demonstrator's motions, the prerecorded video may not be changed, e.g., still be played in the normal mode, but the imitator may be notified to slow down. In an example, a text message may be displayed on the screen of the display device to remind the imitator to slow down. In another example, a voice prompt may be provided to remind the imitator to slow down. In a further example, both the text message and voice prompt may be used to remind the imitator to slow down.

If the result of the comparing indicates that the imitator's motions fall behind the demonstrator's motions within a predetermined time period, the prerecorded video may be changed to the slower mode. In the slower mode, the prerecorded video may be played at a slower speed. For example, if in the normal mode, a speed for playing the prerecorded video is 25 frames per second, then the speed for playing the prerecorded video in the slower mode may be e.g., 20 frames per second.

If the result of the comparing indicates that the imitator does not imitate the demonstrator's motions within the predetermined time period successfully, the prerecorded video may be changed to the easier mode. In the easier mode, the aforementioned supplementary part of the prerecorded video may be played. The imitator may start to imitate the simplified movements and/or decomposition actions of the demonstrator, which may be easier to learn.

It can be seen from the above description that the method for automatic control of video play mode may avoid manual interaction with the display device for displaying the tutorial video during the learning process. The play mode of the tutorial video may be changed automatically based on the imitator's performance, without interrupting the continuity of the imitator's motions. Therefore, the efficiency of imitating may be increased.

Figure 5:
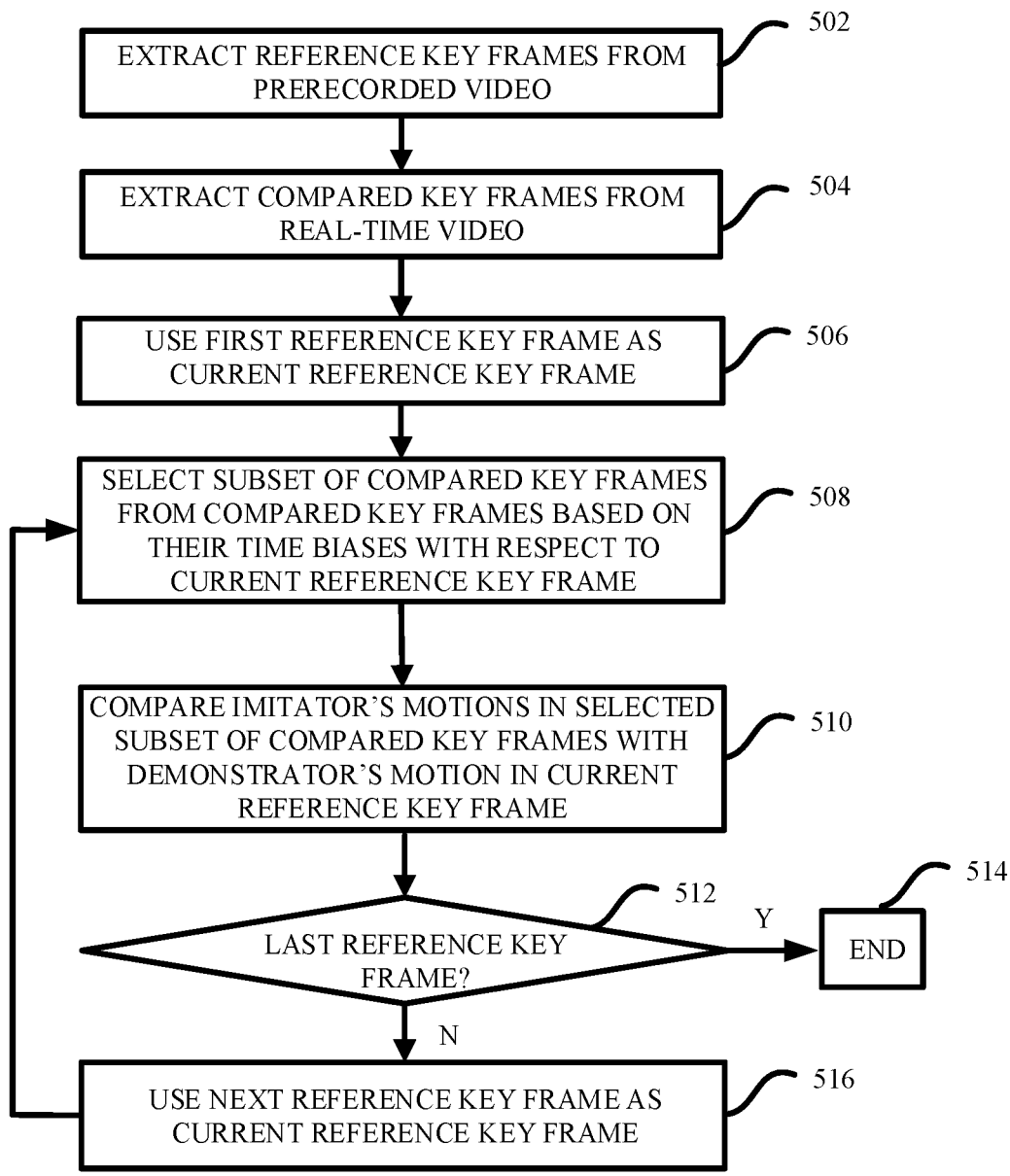
FIG. 5 depicts a schematic flowchart for illustrating an example process of comparing the imitator's motions with the demonstrator's motions in the method depicted by FIG. 4.

FIG. 5 shows a schematic flowchart for illustrating an example process of comparing the imitator's motions with the demonstrator's motions as shown at block 406 of FIG. 4. At block 502, a set of reference key frames may be extracted from the prerecorded video. An example process of extracting the set of reference key frames from the prerecorded video is described in conjunction with FIG. 6 below.

Figure 6:
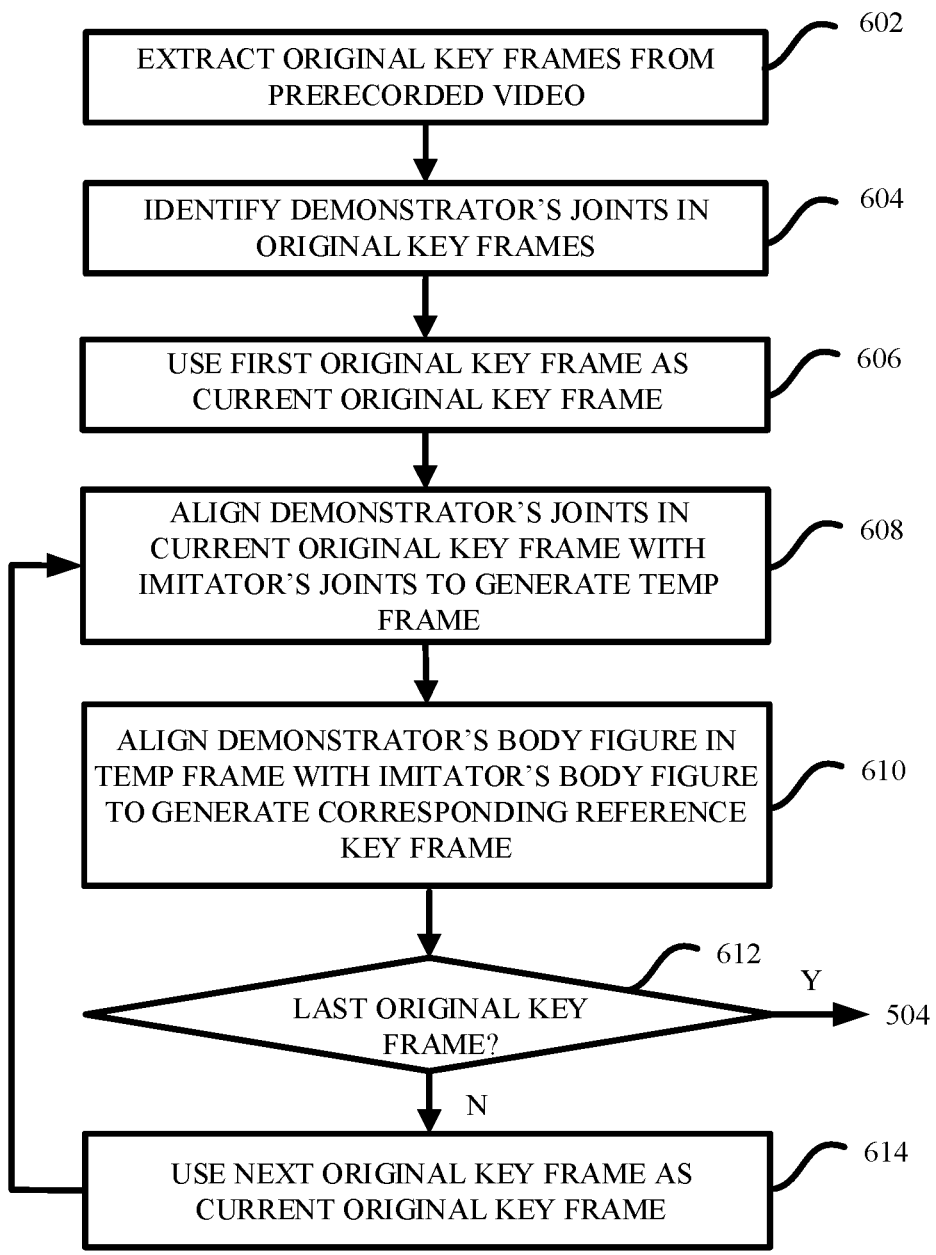
FIG. 6 depicts a schematic flowchart for illustrating an example process of extracting the set of reference key frames from the prerecorded video in the process depicted by FIG. 5.

As shown in FIG. 6, at block 602, a set of original key frames may be extracted from the prerecorded video, e.g., in sequence. The original key frames may be used to identify the demonstrator's respective key motions. The techniques for extracting key frames from a video are known in the art. For example, as disclosed by a current technique, key frames (characteristic frames) may be extracted by a martingale framework. Human's movements can be identified in the key frames. It is noted that any existing or future techniques for extracting key frames can be used in the embodiment.

At block 604, the demonstrator's joints in the set of original key frames may be identified. For example, the demonstrator's joints may be identified based on the 3D model of the demonstrator as described at block 402 of FIG. 4. The techniques for identifying human's joints are known in the art. For example, as disclosed by a current technique, 3D voxels of a human body may be obtained by using a known approach named "shape from silhouette". Then a skeleton model of the human may be initialized. In the skeleton model, the human body may be divided into 11 parts: head, chest, abdomen, left upper arm, left lower arm, right upper arm, right lower arm, left thigh, left shank, right thigh, and right shank. The 3D voxels are classified according to the 11 parts. Then, human's joints may be extracted from the corresponding voxel data based on the classified voxels, and the coordinates of the joints may be derived. It is noted that any existing or future techniques for identifying human's joints can be used in the embodiment.

At block 606, the first original key frame of the set of original key frames may be used as a current original key frame. Here, the first original key frame may refer to the original key frame at the very beginning of the set of original key frames.

At block 608, the demonstrator's joints in the current original key frame may be aligned with the imitator's joints to generate a temp frame. In an embodiment, in order to obtain the information about the imitator's joints, the imitator's body figure may be obtained, in advance, from at least one image of the imitator taken from at least one angle. In an example, at least one image of the imitator may be taken in front of the imitator. Any existing or future technique for contour or figure recognition of a person can be used in the embodiment. As an example, as disclosed by a current technique, a person is detected first, using one or more markers indicating people (e.g. skin and/or facial features), and then the position of the clothing is identified from the location of the person's face. The recognition information of the clothing may correlate to the coloring present in a region predetermined in relative location to the detected face, taking into account the proportionality provided from the image. In this way, the contour or figure of the person may be recognized from a captured image.

Figure 7:
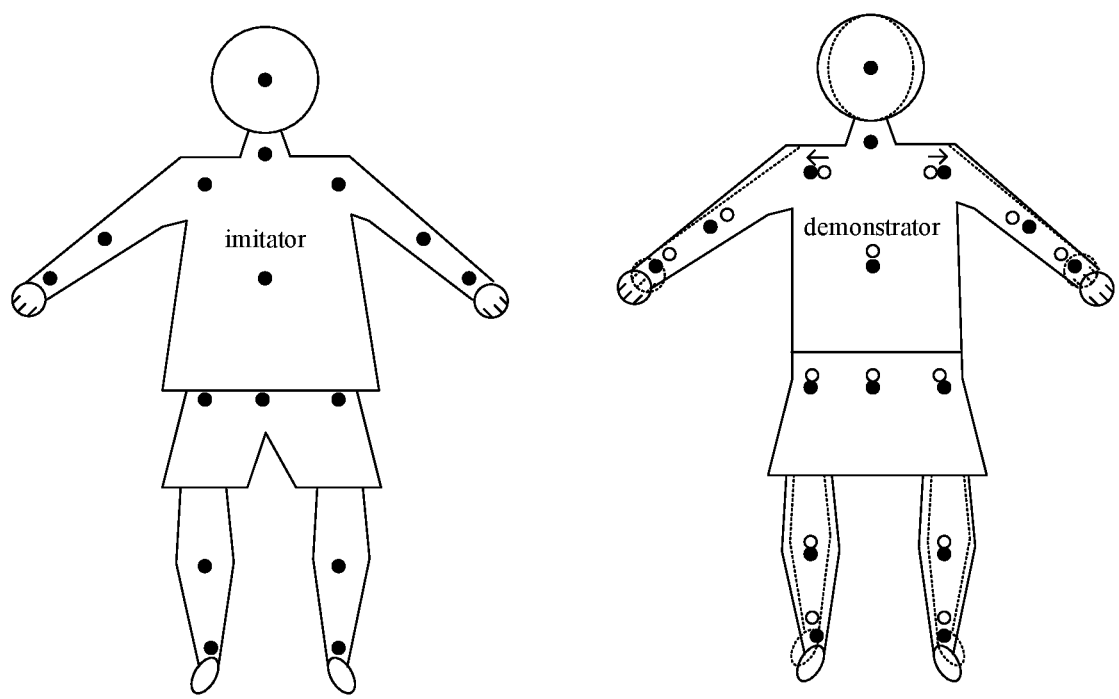
FIG. 7 illustrates an embodiment in which the demonstrator's body figure is aligned with the imitator's body figure.

Next, the imitator's joints may be identified from the at least one image based on the aforementioned techniques for identifying human's joints at block 604. Some example joints of the imitator on the left side of FIG. 7 are shown as solid circles. Then, in the temp frame, the demonstrator's joints in the current original key frame may be adjusted to align with the imitator's joints. For example, as shown on the right side of FIG. 7, the demonstrator's original joints are illustrated as hollow circles. The demonstrator's original joints may be stretched so as to align with the imitator's joints (solid circles). For example, the demonstrator's left shoulder joint may be moved toward the left to align with the imitator's left shoulder joint. The demonstrator's right shoulder joint may be moved toward the right to align with the imitator's right shoulder joint. The arrows illustrate the example directions of these two joints' movements.

At block 610, the demonstrator's body figure in the temp frame may be aligned with the imitator's body figure to generate a corresponding one of the set of reference key frames. In the example of FIG. 7, the demonstrator may be shorter and slimmer than the imitator. After the demonstrator's joints in the current original key frame are aligned with the imitator's joints at block 608, the muscles in different parts of the demonstrator's body may be adjusted to fit in with those of the imitator's body. In this way, the demonstrator's body figure in the temp frame may be aligned with the imitator's body figure. The temp frame in which the demonstrator's body figure aligns with the imitator's body figure may be used as the corresponding reference key frame, which may have a same time stamp as the temp frame and the current original key frame.

At block 612, it may be determined whether the current original key frame is the last original key frame. If the current original key frame is the last original key frame ("Y" at block 612), it implies that all of the original key frames are transformed into the reference key frames. In this case, in an example, the process may go to block 504 of FIG. 5. In the embodiment in which blocks 502 and 504 are executed concurrently, the process may go to block 506 of FIG. 5, if the current original key frame is the last original key frame ("Y" at block 612).

If the current original key frame is not the last original key frame ("N" at block 612), the next original key frame may be used as the current original key frame at block 614. Then, the process may go back to block 608 to process the next original key frame.

Turning back to FIG. 5, at block 504, a set of comparing key frames may be extracted from the real-time video. The set of comparing key frames may be extracted based on the aforementioned techniques for extracting key frames from video. It is to be noted that the comparing key frames may be original key frames extracted from the real-time video or real-time video segments without any further processing.

At block 506, the first reference key frame of the set of reference key frames may be used as a current reference key frame. In an embodiment, when a frame of the prerecorded video corresponding to the first reference key frame is being played or has been played within a certain amount of time (e.g., 2 seconds), the first reference key frame may be used as the current reference key frame. Here, the first reference key frame may refer to the reference key frame at the very beginning of the set of reference key frames.

At block 508, a subset of comparing key frames may be selected from the set of comparing key frames based on their time biases with respect to the current reference key frame. In an example, a time bias of a comparing key frame with respect to the current reference key frame may be calculated by subtracting the time stamp of the comparing key frames from the time stamp of the current reference key frame. The selected subset of comparing key frames may have time biases, the absolute values of which are less than a predetermined threshold (e.g., 2 seconds).

Figure 8:
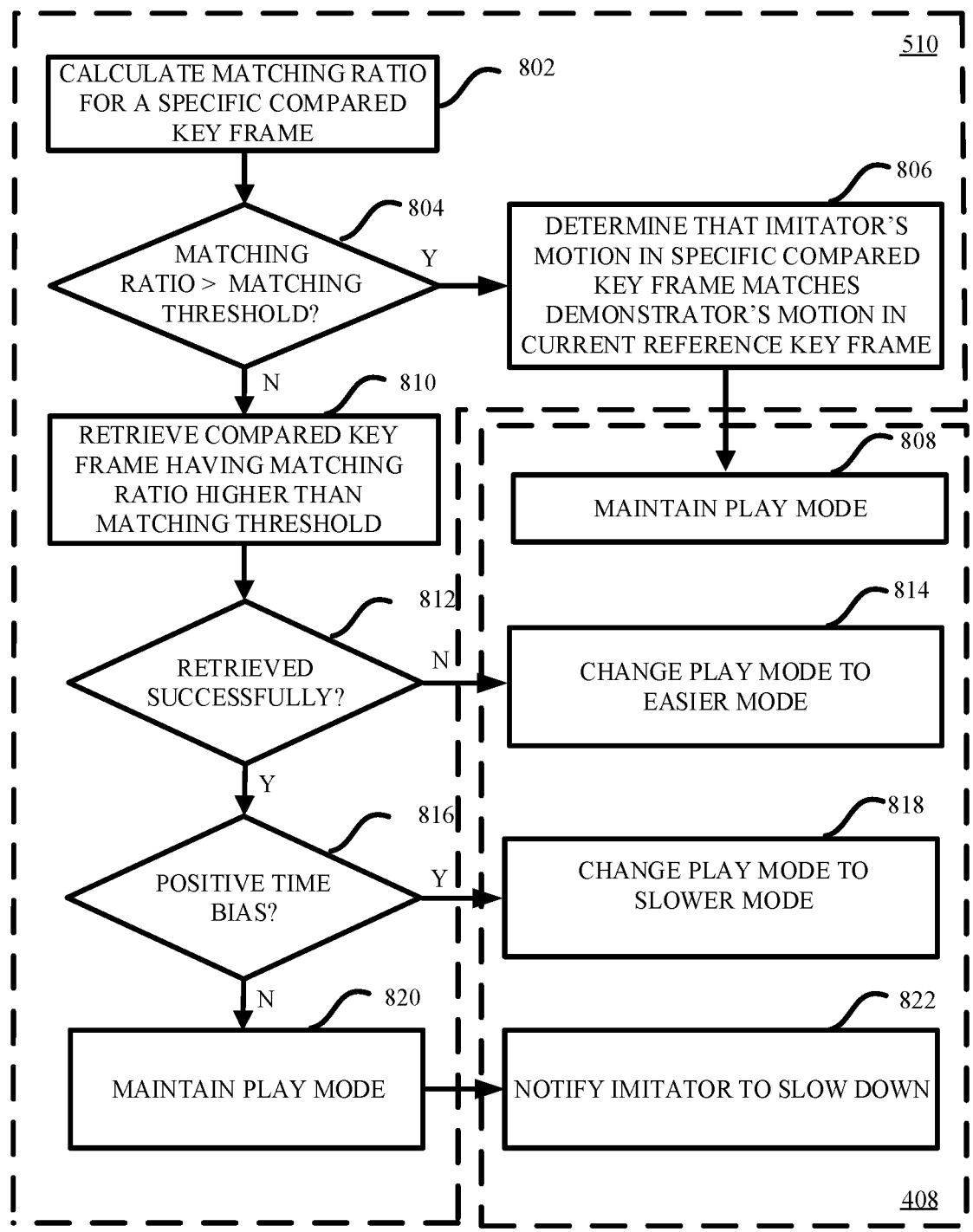
FIG. 8 depicts a schematic flowchart for illustrating an example process of comparing the imitator's motions in the selected subset of comparing key frames with the demonstrator's motion in the current reference key frame in the process depicted by FIG. 5 and controlling a play mode of the prerecorded video based on a result of the comparing in the method depicted by FIG. 4.

At block 510, the imitator's motions in the selected subset of comparing key frames are compared with the demonstrator's motion in the current reference key frame. FIG. 8 shows a schematic flowchart for illustrating an example process of comparing the imitator's motions in the selected subset of comparing key frames with the demonstrator's motion in the current reference key frame as shown at block 510 of FIG. 5 and controlling the play mode of the prerecorded video based on the result of the comparing as shown at block 408 of FIG. 4.

Figure 9:
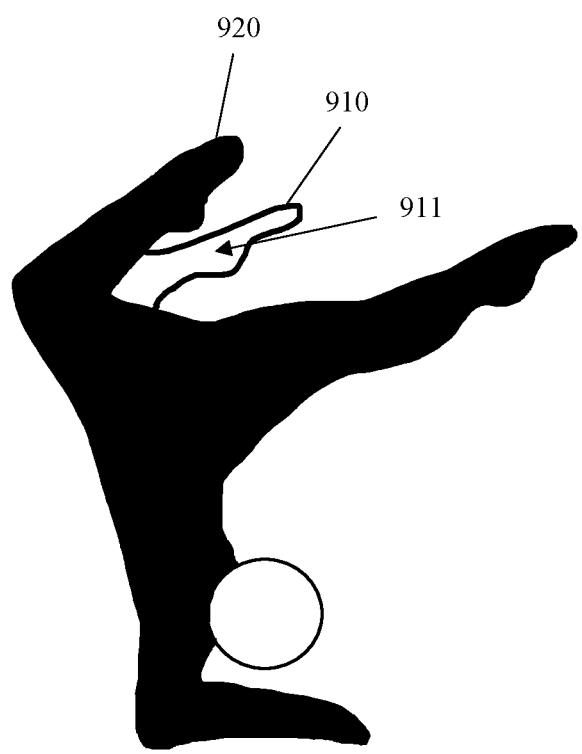
FIG. 9 illustrates an imitator's body shape and a demonstrator's body shape.

As shown in FIG. 8, at block 802, a matching ratio of the imitator's body shape and the demonstrator's body shape in the current reference key frame may be calculated for a specific comparing key frame of the selected subset. The specific comparing key frame may have no time bias with respect to the current reference key frame. The specific comparing key frame may illustrate the imitator's motion at the same time point as the current reference key frame. FIG. 9 illustrates the imitator's body shape 910 and the demonstrator's body shape 920, which may be partially overlapped. A non-overlapping region of the imitator's body shape 910 may be shown as the white region 911. The matching ratio of the imitator's body shape and the demonstrator's body shape may be calculated by $1-A911/A920$, wherein A911 denotes the area of the white region 911, and A920 denotes the area of the demonstrator's body shape 920.

Turning back to FIG. 8, at block 804, it may be determined whether the matching ratio is higher than a matching threshold. The match threshold may be set by the imitator. If the matching ratio is higher than a matching threshold ("Y" at block 804), it may be determined, at block 806, that the imitator's motion in the specific comparing key frame matches the demonstrator's motion in the current reference key frame. In this case, the result of the comparing indicates that the imitator's motions keep up with the demonstrator's motions. Therefore, the play mode may be maintained, at block 808.

If the matching ratio is not higher than the matching threshold ("N" at block 804), a comparing key frame having the matching ratio higher than the matching threshold may be retrieved from the selected subset of comparing key frames, at block 810. The matching ratios for the respective comparing key frames of the selected subset may be calculated based on the algorithm described at block 802.

At block 812, it may be determined whether the comparing key frame having the matching ratio higher than the matching threshold is retrieved from the selected subset of comparing key frames successfully. If not ("N" at block 812), it may indicate that the imitator cannot follow the demonstrator's motions. Therefore, the play mode of the prerecorded video may be changed to the easier mode, at block 814. In an example, the imitator may be notified of the change of the play mode.

If the comparing key frame having the matching ratio higher than the matching threshold is retrieved from the selected subset of comparing key frames successfully ("Y" at block 812), the process may go to block 816 to determine whether the retrieved comparing key frame has a positive time bias with respect to the current reference key frame. If yes ("Y" at block 816), it may indicate that the imitator's current motion falls behind the demonstrator's corresponding motion. Therefore, the play mode of the prerecorded video may be changed to a slower mode at block 818, such that it may be easier for the imitator to catch up. In an example, the imitator may be notified of the change of the play mode.

From the above, if the retrieved comparing key frame does not have the positive time bias with respect to the current reference key frame ("N" at block 816), then the retrieved comparing key frame may have a negative time bias with respect to the current reference key frame. In this case, the imitator's current motion may be ahead of the demonstrator's corresponding motion. Therefore, the play mode of the prerecorded video may be maintained, and the imitator may be notified to slow down.

Turning back to FIG. 5, at block 512, it may be determined whether the current reference key frame is the last reference key frame. If the current reference key frame is the last reference key frame ("Y" at block 512), the prerecorded video may reach its end. Then, the process may go to block 514, at which the process may be ended. If the current reference key frame is not the last reference key frame ("N" at block 512), the next reference key frame may be used as the current reference key frame at block 516. Then, the process may go back to block 508 to process the next reference key frame.

In an alternative embodiment, another scheme may be adopted to compare the imitator's motions with the demonstrator's motions at block 406. In the example process of block 406 as shown in FIG. 5, the set of original key frames may be used as the set of reference key frames, at block 502. Therefore, the operations at blocks 602 to 614 of FIG. 6 may be not performed. The operation at block 510 may further include the following actions (not shown in the figures) in addition to those as shown in FIG. 8. In this alternative embodiment, the demonstrator's joints in the current reference key frame may be identified based on the aforementioned techniques for identifying human's joints. Based on the similar techniques, the imitator's joints in each of the selected subset of comparing key frames may be identified. Then, a shape of the imitator's joints in each of the selected subset of comparing key frames may be compared with a shape of the demonstrator's joints in the current reference key frame, respectively. A detailed example process of joint shape comparing may also be illustrated by FIG. 8. In this case, the matching ratio used at blocks 802, 804 and 810 of FIG. 8 may be, for example, a matching percentage of the imitator's joints shape and the demonstrator's joints shape.

Under the same inventive concept, another embodiment of the present disclosure can provide an apparatus for automatic control of video play mode. The apparatus may include one or more processors, a memory coupled to the one or more processors, and a set of computer program instructions stored in the memory. The set of computer program instructions are executed by the one or more processors to play a prerecorded video of a demonstrator's motions; obtain a real-time video of an imitator's motions; compare the imitator's motions in the real-time video with the demonstrator's motions in the prerecorded video; and control a play mode of the prerecorded video based on a result of the comparing.

Similarly, under the same inventive concept, another embodiment of the present disclosure can provide a computer program product for automatic control of video play mode. The computer program product comprises a computer readable storage medium having program instructions embodied therewith. The program instructions are executable by one or more processors to implement the method according to the embodiments of the present disclosure.

In the context, the term "body figure" is used to indicate the natural body characteristics of a person, which is not related to the motion of the person. When the person is doing different motions, his/her body figure is not changed. Differently, the term "body shape" is used to indicate a shape or contour of a person's body. When the person is doing different motions, his/her body shape is changed accordingly.

In the above embodiments, the demonstrator may be described as a human being. It is to be noted that, the demonstrator may also be a robot or any other kinds of creatures which may have similar body figures and may perform similar motions with respect to the human being. It is possible for those skilled in the art to amend the above embodiments to adapt for the robot or other creatures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
displaying, by one or more processors, a prerecorded video of a demonstrator's motions;
obtaining, by one or more processors, a real-time video of an imitator's motions;
extracting, by one or more processors, a set of original key frames from the prerecorded video;
identifying, by one or more processors, the demonstrator's joints in the set of original key frames;
for each of the set of original key frames as a current original key frame,
aligning, by one or more processors, the demonstrator's joints in the current original key frame with the imitator's joints to generate a temp frame; and
aligning, by one or more processors, the demonstrator's body figure in the temp frame with the imitator's body figure to generate a corresponding one of a set of reference key frames, wherein the imitator's body figure is obtained from at least one image of the imitator taken from at least one angle, and the imitator's joints are identified from the at least one image;

extracting, by one or more processors, a set of comparing key frames from the real-time video;

for each of the set of reference key frames as a current reference key frame, selecting, by one or more processors, a subset of comparing key frames from the set of comparing key frames based on their time biases with respect to the current reference key frame; and comparing, by one or more processors, the imitator's motions in the selected subset of comparing key frames with the demonstrator's motion in the current reference key frame; and controlling, by one or more processors, a display mode of the prerecorded video based on a result of the comparing.

2. The computer-implemented method of claim 1, wherein the comparing the imitator's motions in the selected subset of comparing key frames with the demonstrator's motion in the current reference key frame comprises:

calculating for a specific comparing key frame of the selected subset, by one or more processors, a matching ratio of the imitator's body shape and the demonstrator's body shape in the current reference key frame, wherein the specific comparing key frame has no time bias with respect to the current reference key frame; and in response to the matching ratio being not higher than a matching threshold, retrieving, by one or more processors, from the selected subset a comparing key frame having the matching ratio higher than the matching threshold.

3. The computer-implemented method of claim 2, wherein the controlling the display mode of the prerecorded video based on the result of the comparing comprises:

in response to the retrieved comparing key frame having a positive time bias with respect to the current reference key frame, changing, by one or more processors, the display mode to a slower mode.

4. The computer-implemented method of claim 2, wherein the controlling the display mode of the prerecorded video based on the result of the comparing comprises:

in response to the retrieved comparing key frame having a negative time bias with respect to the current reference key frame, maintaining, by one or more processors, the display mode; and notifying, by one or more processors, the imitator.

5. The computer-implemented method of claim 2, wherein the controlling the display mode of the prerecorded video based on the result of the comparing comprises:

in response to no comparing key frame having the matching ratio higher than the matching threshold being retrieved from the selected subset, changing, by one or more processors, the display mode to an easier mode.

6. The computer-implemented method of claim 2, wherein the comparing the imitator's motions in the selected subset of comparing key frames with the demonstrator's motion in the current reference key frame further comprises:

in response to the matching ratio being higher than the matching threshold, determining, by one or more processors, that the imitator's motion in the specific comparing key frame matches the demonstrator's motion in the current reference key frame.

7. The computer-implemented method of claim 6, wherein the controlling the display mode of the prerecorded video based on the result of the comparing comprises:

in response to the imitator's motion in the specific comparing key frame matching the demonstrator's motion in the current reference key frame, maintaining, by one or more processors, the display mode.

8. The computer-implemented method of claim 1, wherein the comparing the imitator's motions in the selected subset of comparing key frames with the demonstrator's motion in the current reference key frame comprises:

identifying, by one or more processors, the demonstrator's joints in the current reference key frame;

identifying, by one or more processors, the imitator's joints in each of the selected subset of comparing key frames; and comparing, by one or more processors, a shape of the imitator's joints in each of the selected subset of comparing key frames with a shape of the demonstrator's joints in the current reference key frame, respectively.

9. An apparatus comprising:

one or more processors;

a memory coupled to the one or more processors; and a set of computer program instructions stored in the memory and executed by the one or more processors to implement a method comprising:

displaying a prerecorded video of a demonstrator's motions;

obtaining a real-time video of an imitator's motions;

extracting a set of original key frames from the prerecorded video;

identifying the demonstrator's joints in the set of original key frames;

for each of the set of original key frames as a current original key frame, aligning the demonstrator's joints in the current original key frame with the imitator's joints to generate a temp frame; and aligning the demonstrator's body figure in the temp frame with the imitator's body figure to generate a corresponding one of a set of reference key frames, wherein the imitator's body figure is obtained from at least one image of the imitator taken from at least one angle, and the imitator's joints are identified from the at least one image;

extracting a set of comparing key frames from the real-time video;

for each of the set of reference key frames as a current reference key frame, selecting a subset of comparing key frames from the set of comparing key frames based on their time biases with respect to the current reference key frame; and comparing the imitator's motions in the selected subset of comparing key frames with the demonstrator's motion in the current reference key frame; and controlling a display mode of the prerecorded video based on a result of the comparing.

10. The apparatus of claim 9, wherein the comparing the imitator's motions in the selected subset of comparing key frames with the demonstrator's motion in the current reference key frame comprises:

calculating for a specific comparing key frame of the selected subset a matching ratio of the imitator's body shape and the demonstrator's body shape in the current reference key frame, wherein the specific comparing key frame has no time bias with respect to the current reference key frame; and in response to the matching ratio being not higher than a matching threshold, retrieving from the selected subset a comparing key frame having the matching ratio higher than the matching threshold.

11. The apparatus of claim 10, wherein the controlling the display mode of the prerecorded video based on the result of the comparing comprises:

in response to the retrieved comparing key frame having a positive time bias with respect to the current reference key frame, changing the display mode to a slower mode.

12. The apparatus of claim 10, wherein the controlling the display mode of the prerecorded video based on the result of the comparing comprises:

in response to the retrieved comparing key frame having a negative time bias with respect to the current reference key frame, maintaining the display mode; and notifying the imitator.

13. The apparatus of claim 10, wherein the controlling the display mode of the prerecorded video based on the result of the comparing comprises:

in response to no comparing key frame having the matching ratio higher than the matching threshold being retrieved from the selected subset, changing the display mode to another mode.

14. The apparatus of claim 10, wherein the comparing the imitator's motions in the selected subset of comparing key frames with the demonstrator's motion in the current reference key frame further comprises:

in response to the matching ratio being higher than the matching threshold, determining, by one or more processors, that the imitator's motion in the specific comparing key frame matches the demonstrator's motion in the current reference key frame.

15. The apparatus of claim 14, wherein the controlling the display mode of the prerecorded video based on the result of the comparing comprises:

in response to the imitator's motion in the specific comparing key frame matching the demonstrator's motion in the current reference key frame, maintaining, by one or more processors, the display mode.

16. The apparatus of claim 9, wherein the comparing the imitator's motions in the selected subset of comparing key frames with the demonstrator's motion in the current reference key frame comprises:

identifying the demonstrator's joints in the current reference key frame;

identifying the imitator's joints in each of the selected subset of comparing key frames; and comparing a shape of the imitator's joints in each of the selected subset of comparing key frames with a shape of the demonstrator's joints in the current reference key frame, respectively.

17. A computer program product, wherein the computer program product comprises a computer readable storage medium having program instructions embodied therewith, wherein the program instructions are executable by one or more processors to implement a method comprising:

displaying a prerecorded video of a demonstrator's motions;

obtaining a real-time video of an imitator's motions;

extracting a set of original key frames from the prerecorded video;

identifying the demonstrator's joints in the set of original key frames;

for each of the set of original key frames as a current original key frame, aligning the demonstrator's joints in the current original key frame with the imitator's joints to generate a temp frame; and aligning the demonstrator's body figure in the temp frame with the imitator's body figure to generate a corresponding one of a set of reference key frames, wherein the imitator's body figure is obtained from at least one image of the imitator taken from at least one angle, and the imitator's joints are identified from the at least one image;

extracting a set of comparing key frames from the real-time video;

for each of the set of reference key frames as a current reference key frame, selecting a subset of comparing key frames from the set of comparing key frames based on their time biases with respect to the current reference key frame; and comparing the imitator's motions in the selected subset of comparing key frames with the demonstrator's motion in the current reference key frame; and controlling a display mode of the prerecorded video based on a result of the comparing.

18. The computer program product of claim 17, wherein the comparing the imitator's motions in the selected subset of comparing key frames with the demonstrator's motion in the current reference key frame comprises:

calculating for a specific comparing key frame of the selected subset a matching ratio of the imitator's body shape and the demonstrator's body shape in the current reference key frame, wherein the specific comparing key frame has no time bias with respect to the current reference key frame; and in response to the matching ratio being not higher than a matching threshold, retrieving from the selected subset a comparing key frame having the matching ratio higher than the matching threshold.

19. The computer program product of claim 18, wherein the controlling the display mode of the prerecorded video based on the result of the comparing comprises:

in response to the retrieved comparing key frame having a positive time bias with respect to the current reference key frame, changing the display mode to a slower mode.

20. The computer program product of claim 18, wherein the controlling the display mode of the prerecorded video based on the result of the comparing comprises:

in response to the retrieved comparing key frame having a negative time bias with respect to the current reference key frame, maintaining the display mode; and notifying the imitator.

* * * * *